United States Patent
Falck et al.

(10) Patent No.: US 8,705,387 B2
(45) Date of Patent: Apr. 22, 2014

(54) TIME SYNCHRONIZATION OF A PLURALITY OF DIFFERENT WIRELESS NETWORKS WITH DATA SENSORS

(75) Inventors: Thomas Falck, Aachen (DE); Victor Martinus Gerardus Van Acht, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 360 days.

(21) Appl. No.: 12/920,120

(22) PCT Filed: Mar. 5, 2009

(86) PCT No.: PCT/IB2009/050909
§ 371 (c)(1),
(2), (4) Date: Aug. 30, 2010

(87) PCT Pub. No.: WO2009/112985
PCT Pub. Date: Sep. 17, 2009

(65) Prior Publication Data
US 2011/0002324 A1    Jan. 6, 2011

(30) Foreign Application Priority Data

Mar. 11, 2008 (EP) .................................. 08102499

(51) Int. Cl.
*H04L 12/26* (2006.01)
*H04H 20/71* (2008.01)
*H04J 1/00* (2006.01)
*H04L 12/28* (2006.01)
*H04J 3/26* (2006.01)

(52) U.S. Cl.
USPC ........... 370/252; 370/312; 370/343; 370/351; 370/432; 370/480

(58) Field of Classification Search
CPC .................................................. A61B 5/0026
USPC ......... 370/229–231, 235, 236, 241, 252, 310, 370/343–345, 347, 350, 351, 431–433, 442, 370/458, 464, 480, 498, 503
See application file for complete search history.

(56) References Cited

U.S. PATENT DOCUMENTS

| | | | | |
|---|---|---|---|---|
| 5,748,103 | A | * | 5/1998 | Flach et al. ............... 340/870.07 |
| 2005/0275542 | A1 | * | 12/2005 | Weekes ...................... 340/573.1 |

(Continued)

FOREIGN PATENT DOCUMENTS

| | | |
|---|---|---|
| GB | 2434718 A | 8/2007 |
| WO | 03015452 A2 | 2/2003 |

(Continued)

OTHER PUBLICATIONS

Ruzzelli et al: "Energy Reduction Techniques for Multihop-Enabled 802.15.4 Networks"; European Cooperation in the Field of Scientific and Technical Research; Source: School of Computer Science and Inforamtics, University College, Dublin, Ireland, pp. 1-11 Page Document, 2008, Downloaded From: www.cost2100.org/uploads/FILEIV%20MCM/TDs/TD(08)437.pdf.

(Continued)

*Primary Examiner* — Omar Ghowrwal

(57) ABSTRACT

The invention relates to a method for time synchronization of a plurality of different wireless networks A, B, each wireless network (A, B) comprising at least one data sensor (A.1, A.2, A.3, A.4, B.1, B.2, B.3, B.4) for measuring data and a gateway (A.0, B.0) to which the measured data is sent, wherein a common time master (TM) is used which broadcasts time synchronization messages to all networks (A, B) involved. This way, a possibility of time synchronization of a plurality of different wireless networks (A, B) in an easy, efficient and reliable manner is achieved.

19 Claims, 3 Drawing Sheets

(56) References Cited

U.S. PATENT DOCUMENTS

| | | |
|---|---|---|
| 2006/0182056 A1 | 8/2006 | Kim et al. |
| 2006/0215588 A1 | 9/2006 | Yoon |
| 2007/0013511 A1* | 1/2007 | Weiner et al. ............ 340/539.12 |
| 2009/0088605 A1* | 4/2009 | Ross et al. .................... 600/300 |

FOREIGN PATENT DOCUMENTS

| | | | |
|---|---|---|---|
| WO | 2006054190 A1 | 5/2006 | |
| WO | WO2006054190 A1 * | 5/2006 | ............. G06F 19/00 |
| WO | 2007081839 A2 | 7/2007 | |

OTHER PUBLICATIONS

Cox et al: "Time Synchronization for Zigbee Networks": Proceedings of the Thirty-Seventh Southeastern Symposium on System Theory (SSST05), IEEE Cat. No. 05EX961, Mar. 2005, pp. 135-138.

Milenkovic, C. O., et al.; Wireless Sensor Networks for Personal Health Monitoring: Issues and an Implementation; 2006; Computer Communications; 29(13-14)2521-2533.

Yadav, P., et al.; Cluster Based Hierarchical Wireless Sensor Networks (CHWSN) and Time Synchronization in CHWSN; 2007; IEEE Trans. on Communications and Information Technologies; pp. 1149-1154.

* cited by examiner

TIME SYNCHRONIZATION OF A PLURALITY OF DIFFERENT WIRELESS NETWORKS WITH DATA SENSORS

FIELD OF THE INVENTION

The invention relates to the field of wireless networks, and especially to the field of time synchronization of wireless body sensor networks.

BACKGROUND OF THE INVENTION

Almost all wireless body sensor network applications require synchronization of data originating from different sensor nodes. Time synchronization protocols such as the Flooding Time Synchronization Protocol (FTSP) provide a solution for synchronizing all nodes belonging to the same network. FTSP relies on a time master that periodically broadcasts time synchronization messages which are time-stamped at the MAC layer. The receiving nodes compare their local arrival time of the time synchronization message with the time stamp contained in the time synchronization message and use it for estimating the clock skew relative to the time master to synchronize their clocks.

Low-power low-rate radio technologies such as IEEE 802.15.4/ZigBee have been designed for wireless sensor networking and also the first choice for body sensor network applications. However, the aggregated raw data rate of IEEE 802.15.4/ZigBee is limited to 250 kbit/s per channel, which translates to a usable bandwidth for applications of around 100 Kbit/s or 13 Kbytes/s. Thus, applications requiring more bandwidth (such as body motion capturing systems, EEG, EMG) generally partition the system into multiple separate networks operating on different radio channels.

This raises the problem of time synchronization across networks operating on different channels. Applying the FTSP protocol in a straight forward manner would require to have one time master per network and to synchronize all time masters with each other, which leads to a complex and complicated solution.

SUMMARY OF THE INVENTION

It is the object of the invention to provide a possibility of time synchronization of a plurality of different wireless networks in an easy, efficient and reliable manner.

This object is met by a method for time synchronization of a plurality of different wireless networks, each network comprising at least one data sensor for measuring data and a gateway to which the measured data is sent, wherein a common time master is used which broadcasts time synchronization messages to all networks involved.

Accordingly, it is an essential idea of the invention to use a common time master which is responsible for time synchronization of all the networks. Thus, according to the invention, only a single time master is used for all networks instead of an individual time master for each network. This provides for a very simple system design since only one time master is required and, thus, no synchronization between different time masters of different networks is necessary. In addition, there is no need to change the protocol implementation of any sensor node, i.e. the data sensors. To a sensor node the one and only time master appears as its local time master—it cannot see any difference. As a result, without a change, sensor nodes can be used for applications involving only a single network or multiple networks.

According to a preferred embodiment of the invention, for at least one wireless network a plurality of data sensors is used. More preferably, all wireless networks comprise a plurality of data sensors which require synchronization.

Further, according to a preferred embodiment of the invention, the different wireless networks are operated on different radio channels. Furthermore, according to a preferred embodiment of the invention, the time synchronization messages are sent on different radio channels, preferably the radio channels which relate to the respective wireless networks. With respect to this, it is further preferred that only such radio channels are used on which the wireless networks involved are operated. Thus, radio channels not being use are omitted.

Generally, the time synchronization messages can be sent in different ways to the respective wireless networks. However, according to a preferred embodiment of the invention, the time synchronization messages are consecutively sent to the different wireless networks. Further, according to a preferred embodiment of the invention, the time synchronization messages are sent periodically. With respect to this, it is also preferred that the time intervals in which the synchronization messages are sent are specific for each individual wireless network. Accordingly, this way, synchronization can be individually adapted to the requirements of the respective wireless networks.

According to a preferred embodiment of the invention, at least one of the wireless networks is a low-power network, preferably all of the wireless networks are a low-power networks, e.g. ZigBee networks.

The invention is especially useful for wireless body sensor networks. This means that according to a preferred embodiment of the invention, the wireless networks each comprise a plurality of body-worn data sensors. These data sensors can be worn by a single person. However, it is also preferred that two or more body sensor networks are used which belong to different persons.

Moreover, according to a preferred embodiment of invention, the common time master can be used for additional functions. This means that, further to broadcasting time synchronization messages to all networks, according to this preferred embodiment of the invention, the time master is used for broadcasting additional information to at least one, preferably all wireless networks involved. Especially, the time master can transmit network management information relevant for all networks, e.g. a list of free channels without interference etc.

Above mentioned object is further met by an ensemble of a plurality of different wireless networks, each network comprising at least one data sensor for measuring data and a gateway for receiving the measured data from the data sensor, wherein a common time master is provided which is adapted for broadcasting time synchronization messages to all networks involved.

Preferred embodiments of this ensemble of wireless networks relate to the preferred embodiments of the method according to the invention as set out above.

Especially, according to a preferred embodiment of the invention, the different wireless networks are adapted for being operated on different radio channels. Further, according to a preferred embodiment of the invention, at least one of the wireless networks is a low-power network. Preferably all networks involved are low-power wireless networks. Especially, it is preferred that the wireless networks are body sensor networks with a plurality of body-worn data sensors. Furthermore, according to a preferred embodiment of the invention, a data collector is provided which receives data from the data sensors, preferably via a respective gateway of each network.

Preferably, the invention is used for the following applications:

- All body sensor network applications exceeding the bandwidth available in a single channel (approx. 12 Kbytes/s), e.g. EMG (electromyography) systems for capturing muscle activity: 16 sensors×1,000 samples/s×2 bytes/sample=32 Kbytes/s
- EEG (electroencephalograph) systems for recording brain activity: 24 channels×512 samples/s×2 bytes/sample=24 Kbytes/s
- Full human body motion capturing for movement science (sports science, rehabilitation, ergonomics, biomechanics research), character animation (movies, commercials, games), virtual reality (training and simulation, live entertainment): 16 inertial sensors×500 samples/s×(2+2+2) bytes/sample=48 Kbytes/s
- All body sensor network applications requiring synchronization between multiple persons, e.g.
- Body motion capturing systems with inertial sensors for measuring the synchronicity of groups (dance ensembles, synchronous jumping, synchronous parachuting etc., equestrian/horse etc.)
- Synchronization of multiple wireless sensor networks, e.g.
- Lighting atmosphere creation, lighting scenes

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

According to the invention, it is proposed to use only a single time master for all networks operating on different radio channels, instead of using an individual time master for each network. Further, a preferred measure is that the one and only time master consecutively broadcasts its time synchronization messages on all radio channels.

Figure 1:
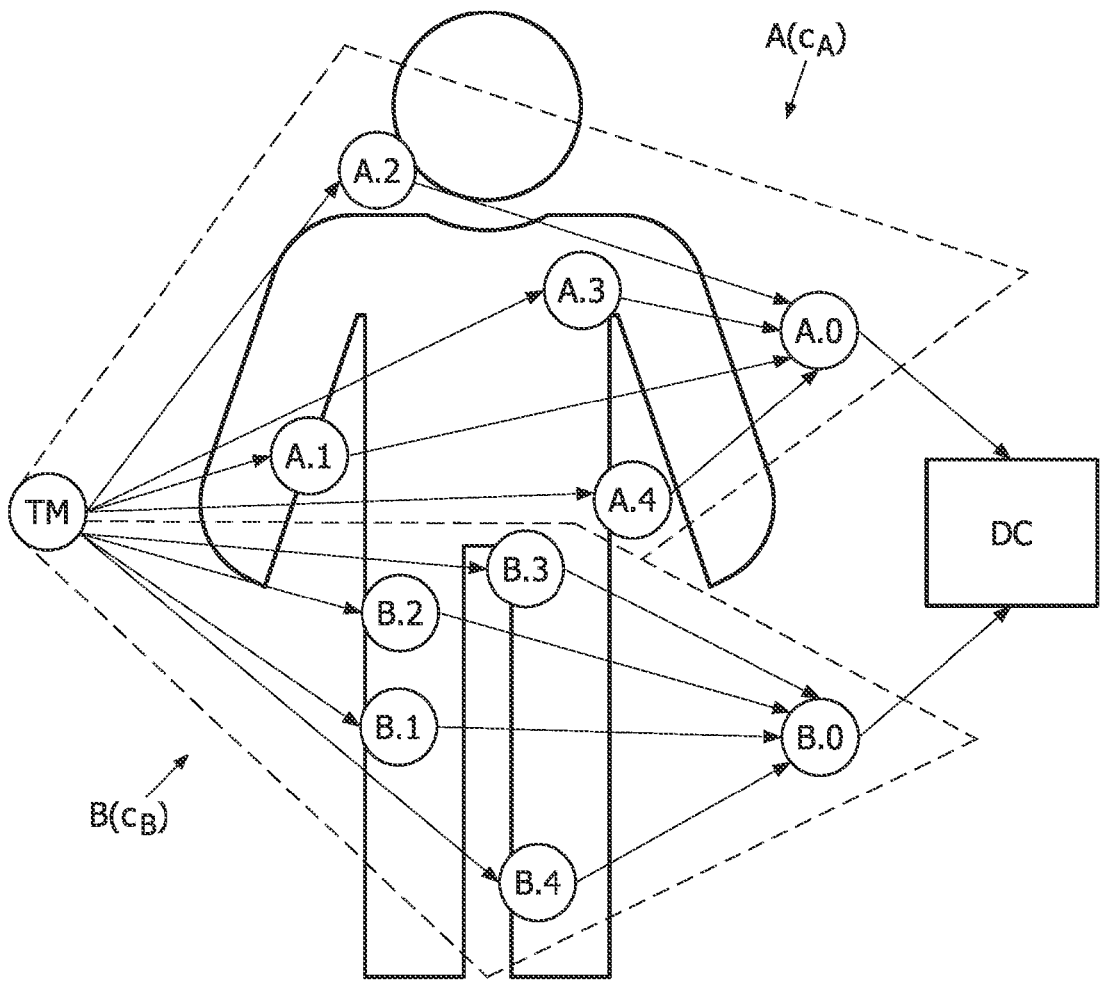
FIG. 1 schematically shows an ensemble of wireless networks according to a first embodiment of the invention, FIG. 2 schematically shows an ensemble of wireless networks according to a second embodiment of the invention.

FIG. 1 schematically shows an ensemble of wireless networks according to an embodiment of the invention. Here, this is shown for a case in which two separate body sensor networks A, B operated on FTSP and on different radio channels $c_A$ and $c_B$ need to be synchronized. Network A operates on channel $c_A$ and consists of four body-worn sensors A.1, A.2, A.3, A.4 sending their readings to gateway A.0. Further, network B operates on channel $c_B$ and consists of four body-worn sensors B.1, B.2, B.3, B.4 sending their readings to gateway B.0. A data collector DC is provided which receives from both gateways A.0 and B.0 data from all sensors A.1, A.2, A.3, A.4, B.1, B.2, B.3, B.4. The time master TM periodically broadcasts the time stamp messages alternately to network A and network B. To this end the time master TM switches back and forth between both radiochannels $c_A$ and $c_B$.

This provides for the following advantages: A simple system design is achieved since there is only one time master TM and thereby no synchronization between time masters of different networks is needed. In addition there is no need to change the FTSP implementation of any sensor A.1, A.2, A.3, A.4, B.1, B.2, B.3, B.4. To a sensor A.1, A.2, A.3, A.4, B.1, B.2, B.3, B.4 the one and only time master TM appears as its local time master—it cannot see any difference. As a result without a change, sensors A.1, A.2, A.3, A.4, B.1, B.2, B.3, B.4 can be used for applications involving only a single network A or B or multiple networks A and B.

Figure 2:
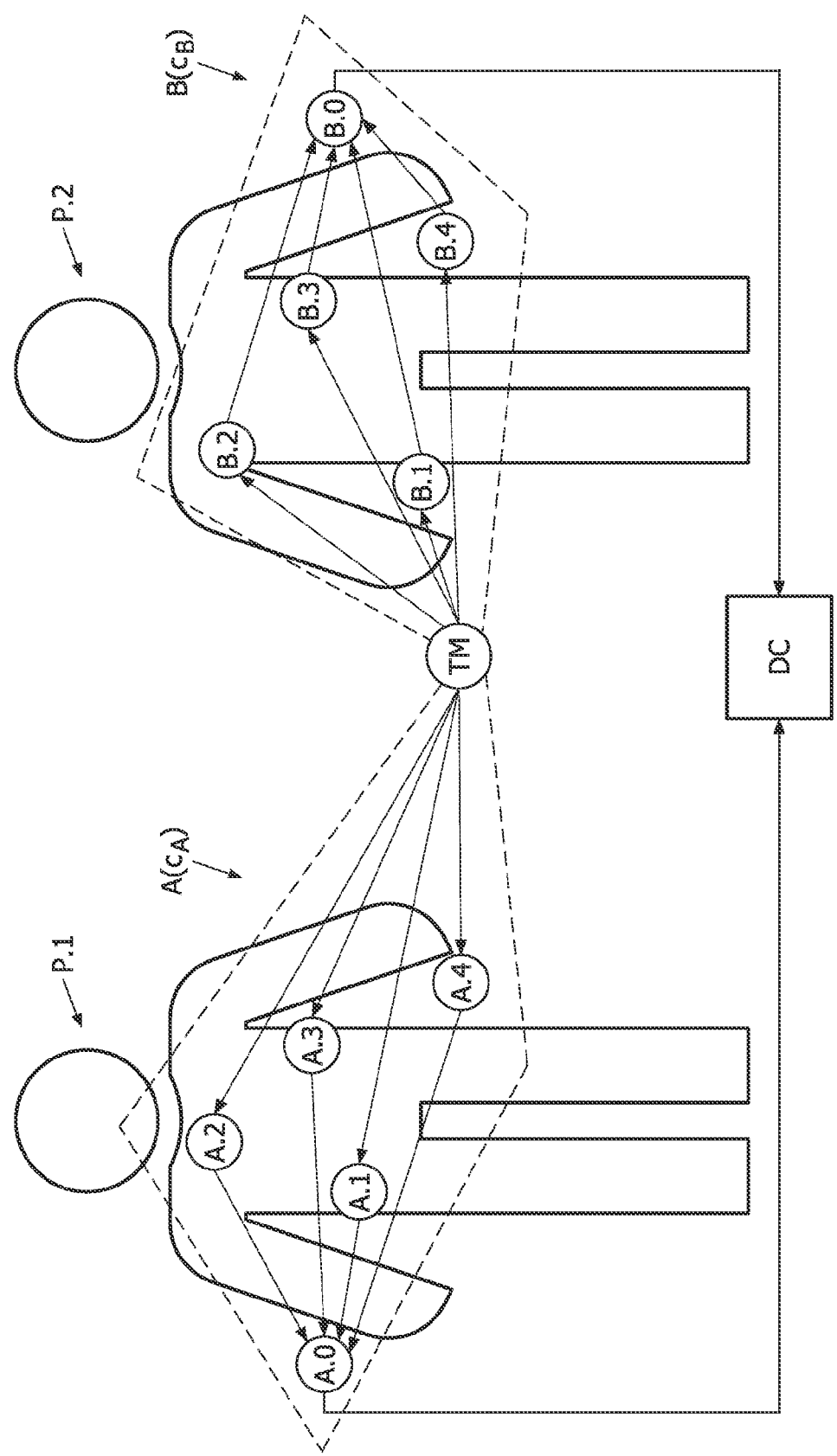

In the same way synchronization between body sensor networks belonging to different persons P.1, P.2 can be achieved as illustrated in FIG. 2 for an application involving two users. In general, the design and method are the same as described before, the body sensor networks only being separated onto two different persons P.1, P.2, the person P.1 being provided with the one network A, and person P.2 being provided with the other network B.

Figure 3:
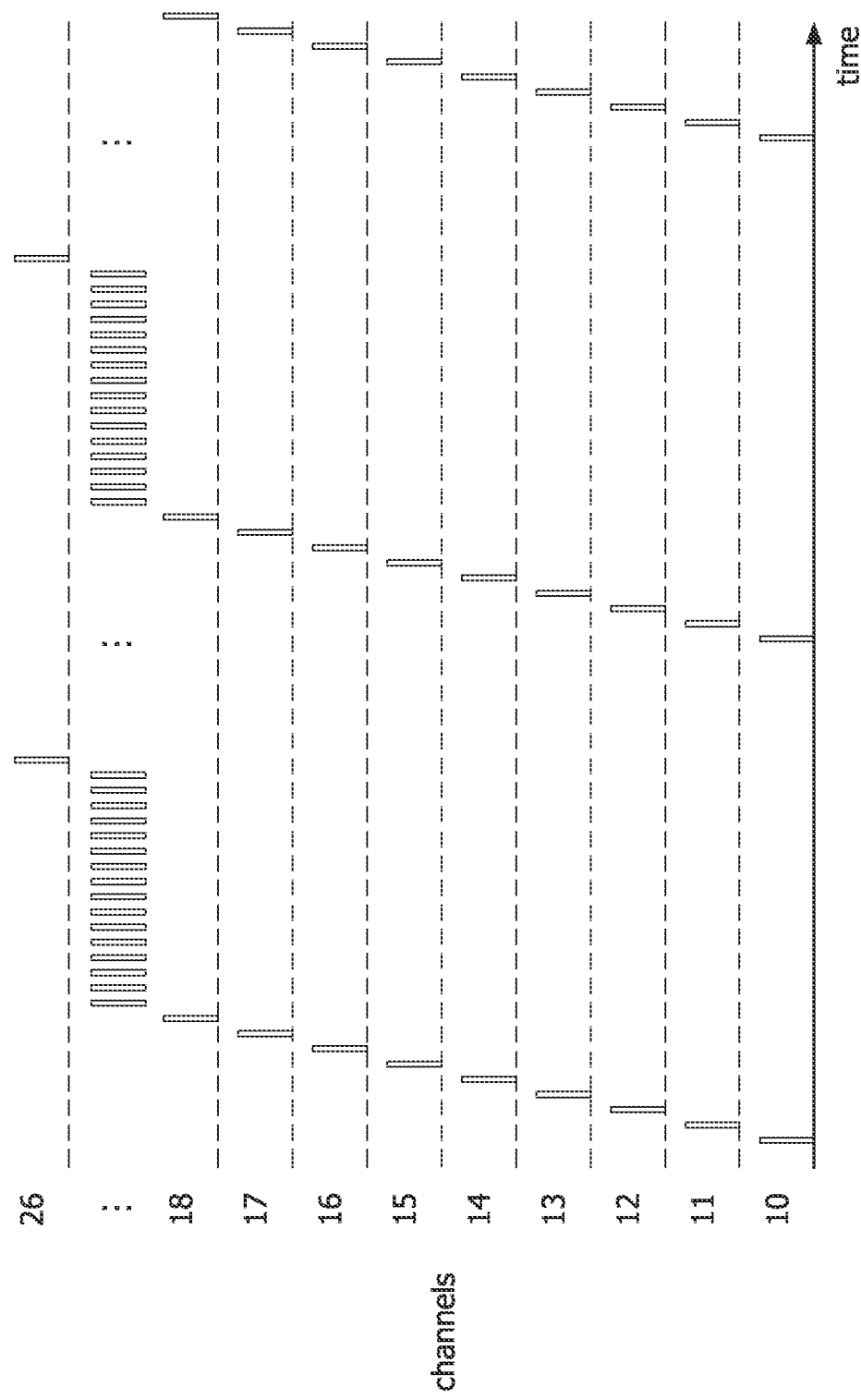
FIG. 3 shows a scheme how a time master roves through the channels of the networks in order to broadcasts time stamp messages.

For IEEE 802.15.4/ZigBee networks, FIG. 3 shows a possible scheme how a time master roves through all 16 IEEE 802.15.4/ZigBee channels 10-26 to broadcasts the time stamp messages as described in the FTSP protocol. The sensor nodes of different networks receive the time stamp messages time-shifted. Since the time master always time-stamps a time synchronization message upon broadcast, the time-shifted reception at different networks does not affect the accuracy of the FTSP algorithm. The sensor nodes ("time slaves") implement the FTSP protocol in the same way as before. For them it looks like that the time synchronization messages are issued from a local time master belonging full time to their own network. Therefore, the solution according to this embodiment of the invention works without any change with all FTSP time slave implementations.

Instead of roving through all channels and broadcasting the time synchronization messages, the time master can maintain a list of network identifiers and corresponding channels. In this case, the time master limits broadcasting time synchronization messages to the networks that are on its list. In addition the list can contain network-specific settings for the interval the time synchronization messages are sent. In this way different requirements of networks in terms of accuracy can be serverd. Furthermore, the time master can play a more general role as overall network manager. Instead of only broadcasting time synchronization messages, in this case, the time master broadcasts network management information relevant to all networks, e.g. a list of free channels without interference.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A system for time synchronization of a plurality of different body sensor networks, the system comprising:

a plurality of different and separate body sensor networks that are operated on different and separate radio frequency channels, each one of the body sensor networks operating on a different and separate radio frequency channel and including:
  at least one data sensor configured to measure data of a person associated with one of the body sensor networks and communicate the measured data on the radio frequency channel of the one of the body sensor networks; and
  a gateway configured to receive the measured data from the at least one sensor of the one of the body sensor networks on the radio frequency channel of the one of the body sensor networks,
a single time master for the plurality of different and separate body sensor networks configured to broadcast time synchronization messages alternately on the different and separate radio frequency channels of each one of the plurality of different and separate body sensor networks; and
a data collector configured to receive the measured data from the gateways of the plurality separate body networks.

2. The system according to claim 1, wherein at least one body sensor network includes a plurality of data sensors.

3. The system according to claim 1, wherein the time synchronization messages are consecutively sent to the different and separate body sensor networks.

4. The system according to claim 1 wherein the single time master is further configured to send the time synchronization messages periodically.

5. The system according to claim 4, wherein the single time master is further configured to send the synchronization messages at time intervals specific to each of the plurality of different and separate body sensor networks.

6. The system according to claim 1, wherein each of the plurality of body sensor networks includes a plurality of body-worn data sensors configured to measure and communicate the data.

7. The system according to claim 6, wherein the plurality of body sensor networks includes two body sensor networks configured to be body-worn by different persons.

8. The system according to claim 1 wherein the single time master, in addition to being configured to broadcast the time synchronization messages to the plurality of different body sensor networks, is configured to broadcasts additional information to at least one of the body sensor networks.

9. A system for time synchronization of a plurality of different wireless networks, the system comprising:
  a plurality of different wireless networks that are operated on different radio channels, each wireless network including:
    at least one data sensor for measuring data; and
    a gateway to which the measured data is sent, and
  a single time master that broadcasts time synchronization messages alternately on the different radio channels of all networks involved;
  wherein the plurality of different wireless networks include:
  a first body sensor network operating on a first radio channel, the first body sensor network including:
    a first sensor which measures and communicates data; and
    a first gateway which receives the data communicated by the first sensor;
  a second body sensor network operating on a second radio channel, the second radio channel being different from the first radio channel and the second body sensor network including:
    a second sensor which measures and communicates data; and
    a second gateway which receives the data communicated by the second sensor;
  and wherein the system further includes:
    a data collector which receives the communicated data from the first and second gateways; and
    the time master broadcasting time synchronization messages alternately on the first and second radio channels to the first and second body second networks.

10. The system according to claim 9, wherein the time master broadcasts the time synchronization messages according to a list of network identifiers and corresponding radio channels.

11. The system according to claim 10, wherein the list includes a network-specific setting for a time interval the time synchronization messages are broadcasted.

12. The system according to claim 11, wherein the time synchronization messages include network management information.

13. The system according to claim 9, wherein the first and second body sensor networks belong to a single person.

14. The system according to claim 9, wherein the first and second body sensor networks belong to different persons.

15. A method for time synchronization of a plurality of different body sensor networks, the method comprising:
  operating a plurality of different body sensor networks on different radio channels;
  measuring data with a first data sensor of a first body sensor network, the first body sensor network operating on a first radio channel;
  communicating the measured data to a first gateway of the first body sensor network;
  measuring data with a second data sensor of a second body sensor network, the second body sensor network operating on a second radio channel and the second radio channel being different from the first radio channel;
  communicating the measured data to a second gateway of the second body sensor network;
  collecting the communicated data from the first and second gateways;
  broadcasting time synchronization messages alternately on the first and second radio channels of the first and second body sensor networks with a single time master.

16. The method according to claim 15, wherein the time synchronization messages are consecutively sent to the different body sensor networks.

17. The method according to claim 15, wherein the time synchronization messages are sent periodically.

18. The method according to claim 17, wherein time intervals in which the synchronization messages are sent are specific for each individual body sensor network.

19. The method according to claim 15, wherein the time synchronization messages include network management information.

* * * * *